United States Patent [19]

Sandford, II et al.

[11] Patent Number: 5,659,726
[45] Date of Patent: Aug. 19, 1997

[54] DATA EMBEDDING

[76] Inventors: Maxwell T. Sandford, II, 160 Monte Rey S.; Theodore G. Handel, 316 Bryce Ave., both of Los Alamos, N. Mex. 87544

[21] Appl. No.: 392,642

[22] Filed: Feb. 23, 1995

[51] Int. Cl.$^6$ .................................................. G06F 17/30
[52] U.S. Cl. ........................... 395/612; 380/4; 380/49; 380/54
[58] Field of Search .......................... 395/600; 380/54, 380/49, 4

[56] References Cited

U.S. PATENT DOCUMENTS

| | | | |
|---|---|---|---|
| 4,965,827 | 10/1990 | McDonald | 380/25 |
| 4,972,476 | 11/1990 | Nathans | 380/23 |
| 5,264,837 | 11/1993 | Buehler . | |
| 5,291,243 | 3/1994 | Heckman et al. | 355/201 |
| 5,321,749 | 6/1994 | Virga | 380/18 |
| 5,398,283 | 3/1995 | Virga | 380/18 |
| 5,488,664 | 1/1996 | Shamir | 380/54 |
| 5,493,677 | 2/1996 | Balough et al. | 395/600 |

OTHER PUBLICATIONS

"Video–Steganography: How to Secretly Embed a Signature in a Picture," K. Matsui and K. Tanaka, IMA Intellectual Property Proceedings, vol. 1, Issue 1, Jan., 1994.

Van Schyndel et al., "A Digital Watermark", Proceedings ICIP–94,Austin Texas, 13–16 Nov. 1994, pp. 86–90 Nov. 1994.

Macq et al., "Cryptology for Digital TV Broadcasting", Proceedings of the IEEE, vol. 83, No. 6, Jun., 1995, pp. 944–957 Jun. 1995.

Steve Walton, "Image Authentication for a Slippery New Age", Dr.Doob's Journal, #229, Apr., 1995, pp. 18–26, 82–87 Apr. 1995.

Boland et al., "Watermarking Digital Images for Copyright-Protection", Fifth International Conference on Image Processingand Its Applications: Edinburgh, UK, 4–6 Jul. 1995, pp. 326–330 Jul. 1995.

*Primary Examiner*—Thomas G. Black
*Assistant Examiner*—Paul R. Lintz
*Attorney, Agent, or Firm*—Milton D. Wyrick; William A. Eklund

[57] ABSTRACT

A method of embedding auxiliary information into a set of host data, such as a photograph, television signal, facsimile transmission, or identification card. All such host data contain intrinsic noise, allowing pixels in the host data which are nearly identical and which have values differing by less than the noise value to be manipulated and replaced with auxiliary data. As the embedding method does not change the elemental values of the host data, the auxiliary data do not noticeably affect the appearance or interpretation of the host data. By a substantially reverse process, the embedded auxiliary data can be retrieved easily by an authorized user.

10 Claims, 19 Drawing Sheets

Computer code for determining pair values.

```
for(i = 0; i < (int)bh.colors; i++) {
    int avg;
    if(i % 10 == 0)fprintf(stderr,".");
    c1.red = colormap[i].r;
    c1.grn = colormap[i].g;
    c1.blu = colormap[i].b;
        if(greyscale) {
            avg = (int)(c1.red + c1.grn + c1.blu)/3;
            if(avg==0)continue;
            if(avg!=c1.red || avg!=c1.grn ||
            avg!=c1.blu)continue;
        }
    (void)rgbhsi(&c1, &d1);    /* convert to HSI
        components */
    if((int)d1.inten == 255)unused++;
    old_diff = 0.f;
    if((int)d1.inten==0 || (int)d1.inten==(int)bh.colors)continue;
    for(j=i+1; j < (int)bh.colors; j++)    {
        c2.red = colormap[j].r;
        c2.grn = colormap[j].g;
        c2.blu = colormap[j].b;
        (void)rgbhsi(&c2, &d2); /* convert to HSI
            components */
        color_diff = d2.hue - d1.hue;
```

*Fig. 2A*

```
/* hue & inten. difference must be ok */
if(!greyscale)    {
if((abs((int)color_diff) < COLOR_NOISE)\
   && (color_diff < old_diff)\
   && ((int)fabs((double)(d2.inten-d1.inten)) <
INTEN_NOISE) ) {
      if(k>(int)bh.cols/2 -1)break;
      pair[k].i = i;
      pair[k].j = j;
      pair[k].count = 0;
      k++;
      old_diff = color_diff;
      }
   }
   else {
      avg = (int)(c2.red + c2.grn + c2.blu)/3;
      if(avg==0)continue;
      if(avg!=c2.red || avg!=c2.grn || avg!=c2.blu)continue;
      if( (int)fabs((double)(d2.inten-d1.inten))<
         INTEN_NOISE &&
            (int)fabs((double)(d2.inten-d1.inten)) !=0)   {
               if(k>(int)bh.cols/2 -1)break;
               pair[k].i = i;
               pair[k].j = j;
```

Fig. 2B

```
                    pair[k].count = 0;
                    k++;
                  }
              }
          } /* j loop */
    if(k>(int)bh.cols/2 -1)break;
    } /* i loop */
        no_pairs = k;
```

Fig. 2C

Computer code to eliminate duplicate pairs.

```
for(i=0;i<k;i++) {
    pair[i].count += (hist_values[pair[i].i] +
        hist_values[pair[i].j]);
    if(pair[i].i==0 II pair[i].j==0)pair[i].count = 0;
}
p_sort(pair, k);
no_pairs = duplicate (k, pair);
total = 0;
for(i=0;i<no_pairs;i++)
    total += pair[i].count;
    total /= 8;
value = (float)total - (float)NCOLS;
if(value > 0.f) fprintf(stderr,"\n%.1f Kb embedding space
    located", value/1000.f);
if(value == 0.f)fprintf(stderr,"\nNo embedding space available in
this image");
if(value < 0.f) fprintf(stderr,"\nInsufficient embedding space");
```

*Fig. 3*

Computer code constraining pair values for Truecolor images.

```
/* Find histogram point-pairs within RANGE counts, within
   10% in number */
for(ip=0;ip<3;ip++)   {
    int nstart;
    long li;
    fprintf(stderr,"\nAnalyzing intensity histogram for plane %d", ip);
    for (i=0;i<256;i++) {
        fvalue[i]=(float)hist_values[ip*256+i];
    }
    nstart = RANGE;
    k = 0;
    while(nstart<256 && k<(int)bh.cols/2)     {
             for (i=nstart;i<256;i++) {
             for(j=i-1;j>i-RANGE;j--) {
                    li = hist_values[ip*256+i];
                    if((int)(fvalue[j]*fvalue[i])==0)break;
                    if((float)fabs((double)(fvalue[j]-fvalue[i]))\
                              < 0.05f*(fvalue[j]+fvalue[i])) {
                        pair[k].i = i;
                        pair[k].j = j;
                        pair[k].count = li + hist_values[ip*256+j];
                        k++;
```

*Fig. 4 A*

```
                if(k>(int)bh.cols/2-1)break;
            }
        } /* end of inner pixel comparison loop
                    (j) */
    if(k>(int)bh.cols/2-1)break;
      } /* end of outer pixel comparison loop (i) */
      p_sort(pair, k);
  no_pairs = duplicate (k, pair);
  k = no_pairs;
      if(verbose)fprintf(stderr,"%3d pairs\r", k);
       nstart = i;
} /* end of while loop */
```

*Fig. 4 B*

Computer code for embedding auxiliary data.

```
/*-------------------------EMBEDDING CODE----------------------------------*/
/*
    lj,     index over pixels in the image-data
    inrow,      index within the image-data row buffer
    nrow, row number in the image-data
    li,     index over pixels in the data-image
    d_inrow, "  within the data-image row buffer
    k,     index within the PAIRS structure array
    maxval, no. of bits embedded
    bitindex, bit position within the data-image byte
    byteplace,  position for read/write in tape6 file
*/ data_row = (unsigned char *)malloc((size_t)NCOLS);
        if(data_row==NULL) {
        pm_error("Data row data allocation failed!");
        return(1);
        }
        maxval = bit_place_index.maxval;
        d_inrow = bit_place_index.d_inrow;
        bit_place_index.li += d_inrow;
        lj = (long)krow;
        k = 0;
        nrow = -1;
        for(li=bit_place_index.li; li<length-NCOLS; li++)      {
        bit_place_index.li = li;
            if(li == -512L)    {    /* header information */
            byteptr=(unsigned char *)&data_header;
            for(d_inrow=0;d_inrow<sizeof(data_header);d_inrow++)
                        data_row[d_inrow]=*(byteptr+d_inrow);
            d_inrow = 0;
            }
```

*Fig. 5 A*

```
if((li >= 0L && (li % (long)NCOLS) == 0L) || reread != 0)
        { /* next row of data-image */
j = fgetpos(tape5,&tape5_pos);
j = fread(data_row, 1, (size_t)NCOLS, tape5);
if(!reread)  {
        for(i=0;i<j;i++) checksum += data_row[i];
        d_inrow = 0;
        bit_place_index.d_inrow = 0;
        }
reread = 0; /* turn off flag for re-read on next Truecolor
        plane */
}
for (bitindex=bit_place_index.bitplace;
        bitindex<NO_BITS; bitindex++) {
bit_place_index.bitplace = bitindex;
        if((lj-krow) % (long)(BYTES_IN_ROW) == 0L)  {
        if(nrow >= 0) {        /* write only after you read */
                inrow = fseek(tape6, byteplace, SEEK_SET);
                inrow =fwrite(image_row,1,(size_t)
                        (BYTES_IN_ROW),tape6);
                byteplace += inrow;
                byteplace += pad;  /* skip pad bytes */
                inrow = krow;
                }
if(lj/(long)OFFSET == 0L ||
(lj+(BYTES_IN_ROW+pad))/
(BYTES_IN_ROW+pad) > (unsigned \long)bh.rows)
                {
                if(bailout())  { /* end of
                image-data--user
                termination */
                    i = 1;
```

*Fig. 5 B*

```
            goto QUIT;
          }
        if(k==no_pairs)goto PLANE;  /* next plane of
                image */
        lj = krow;   /* pick next pair and start over */
        pvalue.i=(unsigned int)pair[k].i;  /*zero*/
        pvalue.j =(unsigned int)pair[k].j; /* one */
        if(verbose && k>0) fprintf(stderr," %ld    ",
                pvalue.count);
        pvalue.count = 0L;
        if(verbose) fprintf(stderr,"\rEmbedding Pair
                %2d\ (%3d,%3d)",\
                k, pvalue.i, pvalue.j);
        else fprintf(stderr,".");
        k++;
        byteplace = bh.pixeloffset;
        }
      inrow = (int)((lj-krow)/((long)BYTES_IN_ROW+pad));  /*
            read next row */
      inrow = fseek(tape6, byteplace, SEEK_SET);
      inrow = fread(image_row,1,(size_t)
            BYTES_IN_ROW,tape6);
      inrow = krow;
      } /* end new row (lj) test */
/* Embed one byte */
   if(ip>=0 && pair[k-1].count==0) {  /* finished a pair */
        lj +=OFFSET;
        inrow += OFFSET;
        bitindex--;
        continue;
        }
```

*Fig. 5 C*

```
if((int)image_row[inrow]==pvalue.i) {      /* find a zero
        value */
    if(test((int)data_row[d_inrow],bitindex))
            image_row[inrow]=(unsigned char)pvalue.j;
        maxval++;
    if(pair[k-1].count==0)   {
        pm_error("\nPair count error!");
        i = 1;
        goto QUIT;
        }
    pair[k-1].count--;
    pvalue.count++;
    if(bitindex==NO_BITS-1)bit_place_index.bitplace
        =0;
    }
    else bitindex--;    /* haven't got this bit yet! */
    lj+=OFFSET;
    inrow+= OFFSET;
    } /* end of bitindex loop */
d_inrow++;
} /* end of li (data index) loop */
```

*Fig. 5 D*

Computer code to analyze lengths of runs.

```
int                int rowstats(unsigned char *data_row, long *histogram,
                        ncols, int packet_size) {
                   int i, j, k, l;      /* loop counters */
                   int runs=0;          /* return value */
                   int count;           /* no. of pixels in the run */
                   char letter = 'A';   /* starting code for flagging runs
                                           in the row */
                   unsigned char block[MAXRUN+3];  /* a block
                                           containing the run being
                                           examined */
                   /* find first bit in the row & adjust as a packet flag */
                   if(packet_size >=0) {
                   j = packet_col(data_row, packet_size, ncols);
                   }
                   if(ncols <=0) return(-1);
                   for(i=MINRUN;i<=MAXRUN;i+=2) { /* i is the runlength being
                           searched */
                       k = 0;
                       for(j=1;j<ncols;j++) {  /* NOTE: data_row[0] is assumed
                               to be zero!! */
                           if(data_row[j]==(unsigned char)ONE) {
                               if(data_row[j-1]!=(unsigned char)ZERO) continue;
```

*Fig. 6 A*

```
                k = j;  /* a block start */
            }
        else continue;
/* find a block of data ending with a zero pixel */
        if(k+i+2 > ncols) break;
        for(l=k;l<k+i+3;l++) block[l-k] = data_row[l];
        l = j;
        if(block[i+1] != (unsigned char)ZERO) goto NEXT;
        if(block[i+2] > (unsigned char)ONE ) goto NEXT;
/* examine block for pixel count */
    count = 0;
        for(l=0;l<i;l++) {  /* all but last bit in block must = 1 */
        if(block[l]==(unsigned char)ONE) count++;
        }
    count++;
    l = j+1;
        if(count == i+1) {  /* set all but last pixel in run to flag
value */
        if(histogram != NULL)histogram[i]++;
                        runs++;
        for(l=j;l<j+count-1;l++) data_row[l] = letter;
        l++
        }
        NEXT: for(j=l+1;j<NCOLS;j++) if(data_row[j]==(unsigned
            char)ZERO)break;
```

*Fig. 6 B*

} /* end of row (j) loop */
letter++;
} /* end of run (l) loop */ return(runs);
}

*Fig. 6 C*

Computer code to set packet-start pixel flag.

```
int packet_col(unsigned char *data_row, int packet_size, int
        ncols) { int i;
/* find first bit in the row & adjust as a packet flag */
for(i=1;i<ncols;i++)      {
    if(data_row[i]==(unsigned char)ZERO)    {
        if(packet_size<0) break;
        if(packet_size>0)    {    /* first bit set to an even
                                     column */
            if(i%2 == 0)break;
            data_row[i] = (unsigned char)ONE;
        }
        else { /* first bit set to an odd column */
        if(i%2 != 0)break;
        data_row[i] = (unsigned char)ONE;
        }
    }
}
if(i==ncols)return(-1);   /* no black pixels in the row */
if(packet_size>=0) return(i);  /* index of the first black pixel */
if(i%2) return(1);       /* if(packet_size==-1) return odd */
else   return(0);        /*                    return even */
}
```

*Fig. 7*

Computer code to embed data in two-color images.

```
READLINE:    nrow = (int)(lj/((long)bh.cols));   /* read
                                                   data from next
                                                   row */
    if(verbose) {
        if(nrow==0)fprintf(stderr,"\n");
        fprintf(stderr,"\rrow %4d", nrow);
    }
    else motion(stderr);
    bit_count = 0;
    image_row[0] = 0;      /* row buffer always starts
                              with a zero */
    if(verbose==2 && nrow <=61)fprintf(tape9,"\nnrow
        byteplace %d %ld",    nrow,byteplace);
    inrow = fseek(tape6, byteplace, SEEK_SET);
    writeplace = byteplace;
    for(j = 1; j < (int)bh.cols+1; j++) {
        int pix;
        if(bit_count <= 0) {   /* need another byte */
            bit_count = 8;
            bit_store = pbm_getrawbyte(tape6);
            byteplace++;
        }
```

*Fig. 8 A*

```
        bit_count -= bh.bitsperpixel;
        pix = ( bit_store >> bit_count ) & mask;
        image_row[j] = (unsigned char)pix;
        #ifdef INSERT_KEY
        /* key row set to zero to hold key pairs */
        if(nrow == KEYLINE)image_row[j] = (unsigned
                char)ZERO;
        #endif
    } /* cols */
byteplace += pad;
j = packet_col(image_row,-1,(int)bh.cols);
i = rowstats(image_row,NULL,(int)bh.cols+1,-1);   /*
        flag the embedding pixels */
if(verbose==2) fprintf(tape9,"\n nrow,i,j: %d %d
        %d", nrow,i,j);
if(j<0 || i==0)    { /* a row of white pixels or no
                pixels for embedding   */
        if(nrow+1<(int)bh.rows) {
                lj += bh.cols;
                goto READLINE;
        }

```
            fprintf(stderr,"\nPacket start-index error,
                    packet %d", packet_no-1);
            goto QUIT;
        }
        if(j==0 && kp > 0) {
            fprintf(stderr,"\nContinuation packet-index
                    error, packet %d", packet_no-1);
            goto QUIT;
        }
        inrow = 1;
        if(kp==0 && verbose==2)
            fprintf(tape9,"\nPacket start-row %d,  bits found
                    %d",nrow,i);
        kp++;
    } /* end new row (lj) test */
/* Embed one byte, use all pairs for each row */
for(k=0;k<no_pairs;k++) {
    if(pair[k].count<0) {
        pm_error("\nPair count error!");
        i = 1;
        goto QUIT;
    }
    testltr = (unsigned char)(letter+(unsigned char)pair[k].i/2 -
            1);    /* flag letter */
```

*Fig. 8 C*

```
if(image_row[inrow]==testltr)      {          /* find a flagged run
        */
    if(verbose==2 && nrow==60) fprintf(tape9,"inrow %d",
        inrow);
    inrow += (unsigned int)pair[k].j;
    lj += pair[k].j;
if(test((int)packet[inpacket_row],bitindex)) image_row
        [inrow-1]=1;
    else image_row[inrow-1]=0;
```

*Fig. 8 D*

DATA EMBEDDING

The present invention generally relates to digital manipulation of numerical data and, more specifically, to the embedding of external data into existing data fields. This invention was made with Government support under Contract No. W-7405-ENG-36 awarded by the U.S. Department of Energy. The Government has certain rights in the invention.

FIELD OF THE INVENTION

The use of data in digital form is revolutionizing communication throughout the world. Much of this digital communication is over wire, microwaves, and fiber optic media. Currently, data can be transmitted flawlessly over land, water, and between satellites. Satellites in orbit allow communication virtually between any two points on earth, or in space.

In many situations, it may be of benefit to send particular secondary data along with the primary data. Secondary data could involve the closed captioning of television programs, identification information associated with photographs, or the sending of covert information with facsimile transmissions. Such a technique is suited also for use as a digital signature verifying the origin and authenticity of the primary data.

Data in digital form are transmitted routinely using wide band communications channels. Communicating in digital fashion is facilitated greatly by error-correcting software and hardware protocols that provide absolute data fidelity. These communication systems ensure that the digital bit stream transmitted by one station is received by the other station unchanged.

However, most digital data sources contain redundant information and intrinsic noise. An example is a digital image generated by scanning a photograph, an original work of electronic art, or a digitized video signal. In the scanning or digital production process of such images, noise is introduced in the digital rendition. Additionally, image sources, such as photographic images and identification cards, contain noise resulting from the grain structure of the film, optical aberrations, and subject motion. Works of art contain noise which is introduced by brush strokes, paint texture, and artistic license.

Redundancy is intrinsic to digital image data, because any particular numerical value of the digital intensity exists in many different parts of the image. For example, a given grey-level may exist in the image of trees, sky, people or other objects. In any digital image, the same or similar numerical picture element, or pixel value, may represent a variety of image content. This means that pixels having similar numerical values and frequency of occurrence in different parts of an image can be interchanged freely, without noticeably altering the appearance of the image or the statistical frequency of occurrence of the pixel values.

Redundancy also occurs in most types of digital information, whenever the same values are present more than once in the stream of numerical values representing the information. For a two-color, black and white FAX image, noise consists of the presence or absence of a black or white pixel value. Documents scanned into black and white BIT-MAP® format contain runs of successive black (1) and white (0) values. Noise in these images introduces a variation in the length of a pixel run. Runs of the same value are present in many parts of the black and white image, in different rows. This allows the present invention also to be applied to facsimile transmissions.

The existence of noise and redundant pixel information in digital data permits a process for implanting additional information in the noise component of digital data. Because of the fidelity of current digital communication systems, the implanted information is preserved in transmission to the receiver, where it can be extracted. The embedding of information in this manner does not increase the bandwidth required for the transmission because the data implanted reside in the noise component of the host data. One may convey thereby meaningful, new information in the redundant noise component of the original data without it ever being detected by unauthorized persons.

It is therefore an object of the present invention to provide apparatus and method for embedding data into a digital information stream so that the digital information is not changed significantly.

It is another object of the present invention to provide apparatus and method for thwarting unauthorized access to information embedded in normal digital data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BACKGROUND OF THE INVENTION

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention there is provided a method of embedding auxiliary data into host data comprising the steps of creating a digital representation of the host data consisting of elements having numerical values and containing a noise component; creating a digital representation of the auxiliary data in the form of a sequence of bits; evaluating the noise component of the digital representation of the host data; comparing elements of the host data with the noise component to determine pairs of the host elements having numerical values which differ by less than said value of said noise component; and replacing individual values of the elements with substantially equivalent values from said pairs of elements in order to embed individual bit values of the auxiliary data corresponding to the sequence of bits of the auxiliary data; and outputting the host data with the auxiliary data embedded into the host data as a file.

In accordance with the purposes of the present invention there is further provided a method of extracting embedded auxiliary data from host data containing a noise component comprising the steps of extracting from the host data a bit sequence indicative of the embedded auxiliary data, and which allows for verification of the host data; interpreting the host data-element pairs which differ by less than the value of the noise component and which correspond to bit values of the auxiliary data; identifying the auxiliary data bit sequence corresponding to the pair values; and extracting the auxiliary data as a file.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2 is a partial listing of computer code used for determining host data pairs having similar values and for converting RGB components to HSI components.

FIG. 3 is a partial listing of computer code used for eliminating duplicate host data pairs.

FIG. 4 is a partial listing of computer code which, for Truecolor images, introduces a constraint on the frequency of occurrence of host data pairs that minimizes the effect of embedding on the host data histogram.

FIG. 5 is a partial listing of computer code that performs the actual embedding of auxiliary data into the host data, including the considerable information which is necessary to manipulate the data in the header information, auxiliary bit-stream, and the host data files.

FIG. 6 is a partial listing of computer code that analyzes the lengths of runs in a row of pixels in two-color facsimile host data.

FIG. 7 is a partial listing of computer code whose purpose is to ensure that the first pixel in a PACKET-START data row starts in an even column number. The location of the first pixel in the row flags the start of the data packets.

FIG. 8 is a partial listing of computer code for embedding data into two-color host images, such as facsimile transmissions.

DETAILED DESCRIPTION

Figure 1:
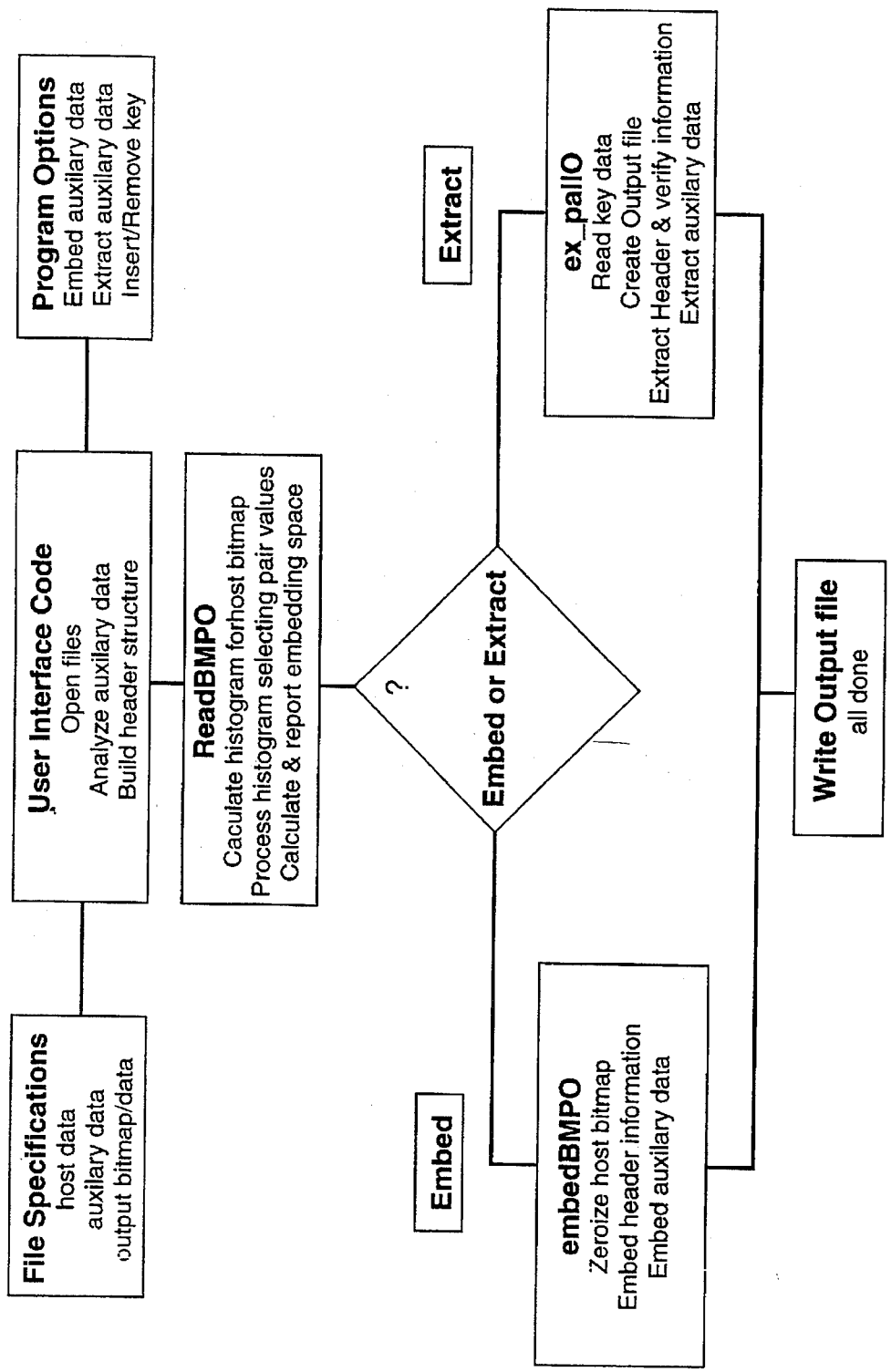
FIG. 1 is a block diagram illustrating the processes used in the embedding and extraction of data from a host.

The present invention allows data to be embedded into a digital transmission or image without naturally discernible alteration of the content and meaning of the transmission or image. This is made possible because of the technique of the present invention, in which similar pixel values in a set of digital host data are re-ordered according to the desired embedded or implanted information. The host data image examples are represented in the MICROSOFT® BITMAP® (.BMP) format, so that the resulting image contains the embedded auxiliary information without that information being readily discernible.

The MICROSOFT® BITMAP® image format is a public-domain format supporting images in the Truecolor, color palette, grey-scale, or black and white representations. Truecolor images have 24-bits per pixel element, with each byte of the pixel element representing the intensity of the red, green, and blue (RGB) color component. Color palette images contain a table of the permitted RGB values. The pixel value in a color palette image is an index to this table. Grey-scale images give the numerical intensity of the pixel values. Black and white representation assigns either zero or one as one of the two possible pixel values. The invention will be made understandable in the context of the BITMAP® image types by reference to the following description.

At the point when most sensory obtained information is represented in digital form, whether it be from video, photographs, laboratory measurements, or facsimile transmissions, the digital data contain intrinsic noise and redundant information which can be manipulated to carry extra information. Through use of this invention, the extra information also can be extracted easily by an authorized and enabled receiver of the data.

Redundancy in digital image data occurs when a particular numerical value of the digital intensity exists in many different parts of the image. Redundancy is found commonly in images because a given grey-level exists in the rendition of trees, sky, clouds, people, and other objects. The presence of noise in digital images permits the picture elements, pixels, to vary slightly in numerical value. For 8-bit digital data, the pixel numerical values range from 0–255. As the pixels having the same or similar numerical values represent a variety of image content, many values in different locations of an image can be interchanged freely. The image appearance and the statistical frequency of occurrence of a particular pixel value are affected little by the interchanging of the spatial position of pixels close in numerical value.

Initially, from the original digital data (hereinafter often referred to as the "host" data), the present invention first converts the host data to digital form, if necessary, and then creates an image histogram to show the probability density of numerical pixel values occurring in the image. The number of times a particular pixel value occurs in the image is plotted versus the value. For 8-bit digital data, the pixel values range from 0–255. Of course, the level of noise in an image will depend on the source of the data, with different noise levels expected between photos, original artwork, digital audio, video, and facsimile transmissions.

The actual embedding of the auxiliary data into the host data is a three-part process, the basic steps of which are illustrated in FIG. 1. First, an estimate of the noise component of the host data is determined and used in combination with an analysis of a histogram of the host data numerical values to identify pairs of values in the host data that occur with approximately the same statistical frequency, and that differ in value by less than the value of the noise component. Second, the position of occurrence of the pair values found is adjusted to embed the bitstream of the auxiliary information set. Third, the identified pairs of values in the host data are used to create a key for the extraction of the embedded data.

Extracting embedded data inverts this process. The key placed in the image in the embedding phase specifies the pair-values which contain the embedded auxiliary information. With the pair-values known, extraction consists of recreating the auxiliary data according to the positions of pixels having the pair-values given in the key. The key data are used first to extract header information. The header information specifies the length and the file name of the auxiliary data, and serves to validate the key. If the image containing embedded information has been modified, the header information will not extract data correctly. However, successful extraction recreates the auxiliary data exactly in an output file.

The principle of data embedding according to the present invention involves the rearrangement of certain host data values in order to encode the values of the extra data which is to be added. For the purposes of this description of the invention, consider a host data set represented by 8 bits of binary information, with values ranging between 0 and 255 bits for each host data sample. Further, assume that the noise value, N, for a signal, S, is given by $N=\pm S/10$, or approximately 10% of the signal value. For many data, the noise component can be approximated by a constant value or percentage, such as the 10% value used for this description. Two values in the host data, $d_i$ and $d_j$, are within the noise value if:

$$|d_i-d_j|=\epsilon \leq N \qquad 10$$

The frequency of occurrence or histogram value of a certain value, $d_i$, is $f(d_i)$. Data values meeting the criteria of Equation 10, and occurring in the host data with frequency of occurrence $f(d_i)-f(d_j)<\delta$, where $\delta$ is the tolerance imposed for statistical equality, are candidates for embedding use. The values, $d_i$ and $d_j$, constitute a pair of data values, $P_k$. There are $k=0,1,2, \ldots N_p$ such pairs in the host data set, giving a total number of embedding bits, $M_k$, for each pair:

$$M_k = \sum_i f(d_i) + \sum_j f(d_j) \qquad 20$$

where the summations for i and j run to the limits of the frequency of occurrence in the data set, $f(d_i)$ and $f(d_j)$, for the respective data values.

It is now helpful to refer to FIG. 2, wherein a partial listing of computer code in the C-Language is printed. The determination of the host data pixel pair values, $d_i$ and $d_j$, in Equation 10, is accomplished through the code listed in FIG. 2. In FIG. 2, these 8 bit values are interpreted as indices in a color palette table. The comparison indicated in Equation 10 is therefore required to be a comparison between the corresponding colors in the palette. Entries in the color palette are Red, Green, and Blue (RGB) color-component values, each within the range of 0–255.

If additional information is desired on the format used for BITMAP® images, reference should be made to two sources. One is the book, *Programming for Graphics Files*, by J. Levine, 1994 (J. Wiley & Sons, New York). The other is a technical article, "The BMP Format," by M. Luse, *Dr. Dobb's Journal*, Vol. 19, Page 18, 1994.

The code fragment in FIG. 2 begins at line 1 with a loop running over the number of colors in the palette. The loop index, i, is used to test each palette color against all other entries, in sequence, to identify pairs of color entries meeting the criteria established by Equation 10. Each color identified in the i-loop then is tested against all other colors in the palette by a second loop using another index, j, starting at line 16. Line 7 provides a modification for images which have a palette for greyscale instead of colors. For greyscale images, the RGB components are identical for each palette entry, although some grey scale formats include a 16-color table as well.

The comparison indicated in Equation 10 is made by converting the Red, Green, and Blue (RGB) color component values to corresponding Hue, Saturation, and Intensity (HSI) color components. Line 12 uses a separate routine, rgbhsi(), to effect this conversion. Line 20 converts RGB color component values in the j-loop to HSI data structure components, and line 21 calculates the color difference in the HSI system. Line 24 then implements the test required by Equation 10. If the color difference is less than a fixed noise value (COLOR_NOISE=10 in the listing of FIG. 2), the intensity difference is tested to determine if the two palette entries are acceptable as differing by less than the noise value specified. Two additional constraints are imposed before accepting the entries as candidate pair values. First, the difference in color is required to be the smallest color difference between the test (i-loop) value, and all the other (j-loop) values. Second, the number of pairs selected (k) must be less than half the number of columns in a row of pixels in the image, in order for the pair-value key to be stored in a single row of pixels. This is an algorithmic constraint, and is not required by the invention.

A data-structure array, pair[], is used to hold the values of candidate pairs (i,j) and their total frequency of occurrence, $M_k$. If the image is a greyscale palette, the test at line 35 is used to force comparison of only the intensity of the two palette entries. Greyscale images do not require the RGB to HSI conversion made for color palettes.

The embedding process of the present invention ignores differences in the saturation component of color palette entries because saturation is ordinarily not noticeable in a color image. Only the Hue and Intensity components are constrained to fall within fixed noise limits to determine the palette pair values.

Pixel pair values found by the code listed in FIG. 2 include generally redundant values. The same pixel value, i, is found in several different pair combinations. Because multiple pairs cannot contain the same palette entry, due to each pair combination of pixel values having to be unique, it is necessary to eliminate some pairs. The number of pairs located by applying the criterion of Equation 10 is stored in the variable, no_pairs, in line 51.

Referring now to FIG. 3, the code fragment listed therein illustrates the manner in which duplicate pairs are eliminated by a separate routine. First, the histogram of the image is used to calculate the total number of occurrences in each pair, as required by Equation 20, above. Line 1 shows the i-loop used to calculate the value, $M_k$, for each pair. Next, the pairs are sorted according to decreasing order of the pair[].count data-structure member in line 5. The elimination of duplicates in the following line retains the pairs, $p_k$, having the largest total number of frequency values, $M_k$. Line 10 and the lines following calculate the total number of bytes that can be embedded into the host data using the unique pixel pairs found by this code fragment.

Sorting the pair values in decreasing order of value, $M_k$, minimizes the number of pairs required to embed a particular auxiliary data stream. However, the security of the embedded data is increased significantly if the pair values are arranged in random order. Randomizing the pair-value order is part of this invention. This is accomplished by rearranging the pair-values to random order by calculating a data structure having entries for an integer index pts[k] .i, $k=0,1,2, \ldots$, no_pairs; and pts[k] .gamma=$\delta_0, \delta_1, \ldots \delta_r$, $\ldots \delta_{no\_pair}$, where the $\delta_r$ values are random. Sorting the data structure, pts[], to put the random values in ascending order randomizes the index values. The random index values are used with the pair-values calculated as indicated above, to re-order the table to give random pair-value ordering.

The algorithm described for palette-format images permits manipulating pixel values without regard to the individual frequency of occurrence. Reference should now be made to FIG. 4 where another code fragment is listed in which, for Truecolor images, a constraint is introduced on the frequency of occurrence that minimizes the effect of embedding on the host data histogram.

Truecolor images consist of three individual 8-bit greyscale images, one each for the red, green, and blue image components. Truecolor images have no color palette. The possible combinations of the three 8-bit components give approximately 16 million colors. The present invention embeds data into Truecolor images by treating each RGB color component image separately. The effect of embedding on the composite image color is therefore within the noise value of the individual color intensity components.

In FIG. 4, the ip-loop starting in line 2 refers to the color plane (ip=0,1,2 for R,G,B). The frequency of occurrence of each numerical value (0 through 255) is given in the array, hist_values[], with the color plane histograms offset by the quantity, ip*256, in line 7. The variable, fvalue[], holds the floating point histogram values for color-component, ip. Line 11 begins a loop to constrain the pairs selected for nearly equal frequency of occurrence. Pixel intensities within the noise limit, RANGE, are selected for comparison of statistical frequency. The tolerance, δ, for statistical agreement is fixed at 5% in line 17. This tolerance could be adjusted for particular applications.

After all possible values are tested for the constraints of noise and statistical frequency, the pairs found are sorted in line 27, the duplicates are removed, the starting index is incremented in line 31, and the search continued. A maximum number of pairs again is set by the algorithmic constraint that the i and j pair values must be less than one-half the number of pixels in an image row. As with palette-format images, the security of the invention includes randomizing the pair-value entries.

Applying the statistical constraint minimizes the host image effects of embedding the auxiliary data. If the tolerance, δ, is set at 0, each pair chosen will contain data values less than the noise value in intensity separation, and occurring with exactly the same statistical frequency. Setting the tolerance at δ=5%, as in the code fragment of FIG. 4, permits the acceptance of pixel pairs that are close in frequency, while still preserving most of the statistical properties of the host data. Few, if any, pairs might be found by requiring exactly the same frequency of occurrence.

The actual embedding of auxiliary data into a set of host data consists of rearranging the order of occurrence of redundant numerical values. The pairs of host data values found by analysis are the pixel values used to encode the bit-stream of the auxiliary data into the host data. It is important to realize that the numerical values used for embedding are the values already occurring in the host data. The embedding process of the current invention does not alter the number or quantity of the numerical values in the host data.

In the embedding process of the present invention, the host data are processed sequentially. A first pass through the host data examines each value and tests for a match with the pixel-pair values. Matching values in the host data are initialized to the data-structure value, pair[k].i, for k=0,1,2 . . . $N_p$. This step initializes the host BITMAP® image (FIG. 1) to the pair values corresponding to zeroes in the auxiliary data. A second pass through the auxiliary data examines the sequential bits of the data to be embedded, and sets the pair-value of the host data element to the value i or j, according to the auxiliary bit value to be embedded. If the bit-stream being embedded is random, the host data pair-values, i and j, occur with equal frequency in the host image after the embedding process is completed.

FIG. 5 illustrates the code fragment that performs the actual embedding, including the considerable information which is necessary to manipulate the data in the header information, auxiliary bit-stream, and the host data files. Lines 1–12 allocate memory and initialize variables. The header and bit-stream data to be embedded are denoted the "data-image," and are stored in the array, data_row[]. The host data are denoted the "image-data."

The index, li, is used in a loop beginning at line 12 to count the byte position in the data-image. The loop begins with li=–512 because header information is embedded before the data-image bytes. Line 14 contains the test for loading data_row[] with the header information. Line 20 contains the test for loading data_row[] with bytes from the data-image file, tape5.

Line 30 starts a loop for the bits within a data-image byte. The variable, bitindex=(0,1,2 . . . 7), counts the bit position within the data-image byte, data_row [d_inrow], indexed by the variable, d_inrow. The variable, lj, indexes the byte (pixel) in the host image. The variable, inrow, indexes the image-data buffer, image_row[inrow]. Line 32 tests for output of embedded data (a completed row of pixels) to the image-data file, and line 40 tests for completion of a pass through the image-data. One pass through the image-data is made for each of the pixel pairs, pair[k], k=0,1,2 . . . Np.

In line 47, the pair index is incremented. A temporary pair data-structure variable named "pvalue" is used to hold the working pair values of the host data pixels being used for embedding. Line 60 provides for refreshing the image-data buffer, image_row.

The embedding test is made at line 72. If the image_row [inrow] content equals the pair value representing a data-image bit of zero, no change is made, and the image-data value remains pvalue.i. However, if the bit-stream value is one, the image-data value is changed to equal pvalue.j. Line 84 treats the case for image-data values not equal to the embedding pair value, pvalue.i. In this case, the bitindex variable is decremented, because the data-image bit is not yet embedded, and the image-data indices are incremented to examine the next host data value.

The extraction of embedded data is accomplished by reversing the process used to embed the auxiliary data-image bit-stream. A histogram analysis of the embedded image-data set will reveal the candidate pairs for extraction for only the case where the individual statistical frequencies are unchanged by the embedding process. In the listings of FIGS. 2–5, the statistical frequencies are changed slightly by the embedding process. The pair table used for embedding can be recreated by analysis of the original image-data, but it cannot generally be recovered exactly from the embedded image-data.

Additionally, as described above, the invention includes randomizing the order of the pair-values, thereby increasing greatly the amount of analysis needed to extract the embedded data without prior knowledge of the pair-value order.

As previously described, the ordered pairs selected for embedding constitute the "key" for extraction of the data-image from the image-data. The listings illustrated in FIGS. 2–5 demonstrate how embedding analysis reduces the statistical properties of the noise component in host data to a table of pairs of numerical values. The key-pairs are required for extraction of the embedded data, but they cannot be generated by analyzing the host data after the embedding process is completed. However, the key can be recreated from the original, unmodified host data. Thus, data embedding is similar to one-time-pad encryption, providing extremely high security to the embedded bit-stream.

With the pair table known, extraction consists of sequentially testing the pixel values to recreate an output bit-stream for the header information and the data-image. In the present invention, the pair table is inserted into the host image-data, where it is available for the extraction process. Optionally, the present invention permits removing the pair table, and storing it in a separate file. Typically, the pair table ranges from a few to perhaps hundreds of bytes in size. The maximum table size permitted is one-half the row length in pixels. With the pair table missing, the embedded data are secure, as long as the original host image-data are unavailable. Thus, the embedding method gives security potential approaching a one-time-pad encryption method.

Another way of protecting the pair table is to remove the key and encrypt it using public-key or another encryption process. The present invention permits an encrypted key to be placed into the host image-data, preventing extraction by unauthorized persons.

Embedding auxiliary data into a host slightly changes the statistical frequency of occurrence of the pixel values used for encoding the bit-stream. Compressed or encrypted embedding data are excellent pseudo-random auxiliary bit-streams. Consequently, embedding auxiliary data having pseudo-random properties minimizes changes in the average frequency of occurrence of the values in the embedding pairs. Embedding character data without compression or encryption reduces significantly the security offered by the present invention.

The existence of embedded data is not detected easily by analyzing the embedded image-data. When viewed as a cryptographic method, data embedding convolves the data-image with the image-data. The original data-image bit-stream embedded represents a plaintext. The combination of the host and embedded data implants ciphertext in the noise component of the host. The existence of ciphertext is not evident however, because the content and meaning of the host carrier information is preserved by the present invention. Data embedding according to the present invention is distinct from encryption because no obvious ciphertext is produced.

Those who are unfamiliar with the terms "plaintext," and "ciphertext" can refer, for example, to B. Schneier, *Applied Cryprography Protocols, Algorithms, and Source Code in C,* J. Wiley & Sons, New York, N.Y., 1994. This reference is incorporated herein by reference.

As mentioned previously, the present invention is useful in the embedding of auxiliary information into facsimile (FAX) data. In the previous discussion concerning embedding auxiliary information into image host data, the noise component originates from uncertainty in the numerical values of the pixel data, or in the values of the colors in a color pallet.

Facsimile transmissions are actually images consisting of black and white BITMAP® data, that is, the data from image pixels are binary (0,1) values representing black or white, respectively, and the effect of noise is to either add or remove pixels from the data. The present invention, therefore, processes a facsimile black-and-white BITMAP® image as a 2-color BITMAP®.

The standard office FAX machine combines the scanner and the digital hardware and software required to transmit the image through a telephone connection. The images are transmitted using a special modem protocol, the characteristics of which are available through numerous sources. One such source, the *User's Manual for the EXP Modem* (UM, 1993), describes a FAX/data modem designed for use in laptop computers. FAX transmissions made between computers are digital communications, and the data are therefore suited to data embedding.

As has been previously discussed with relation to embedding into images, the FAX embedding process is conducted in two stages: analysis and embedding. In the case of a FAX 2-color BITMAP®, image noise can either add or subtract black pixels from the image. Because of this, the length of runs of consecutive like pixels will vary.

The scanning process represents a black line in the source copy by a run of consecutive black pixels in the two color BITMAP® image. The number of pixels in the run is uncertain by at least ±1, because of the scanner resolution and the uncertain conversion of original material to black-and-white BITMAP® format.

Applying data embedding to the two color BITMAP® data example given here therefore consists of analyzing the BITMAP® to determine the statistical frequency of occurrence, or histogram, of runs of consecutive pixels. The embedding process of the present invention varies the length of runs by (0, +1) pixel according to the content of the bit-stream in the auxiliary data- image. Host data suitable for embedding are any two color BITMAP® image which is scaled in size for FAX transmission. A hardcopy of a FAX transmission can be scanned to generate the two color BITMAP®, or the image can be created by using FAX-printer driver software in a computer.

The FAX embedding process begins by analyzing the lengths of runs in each row of pixels. The implementation of this step is illustrated by the code fragment in FIG. 6. The arguments to the routine, rowstats() are a pointer to the pixel data in the row, which consists of one byte per pixel, either a zero or a one in value; a pointer to an array of statistical frequencies; the number of columns (pixels) in the data row; and a flag for internal program options. The options flag is the size of blocks, or packets, of the auxiliary bitstream to be embedded. The options flag is tested in line 9, and the routine, packet_col() is used for a positive option flag. The packet_col() routine is given in the listing of FIG. 7, and its purpose is to ensure that the first pixel in the data row starts in an even column number. The location of the first pixel in the row flags the start of the data packets, which will be further described below.

Line 12 begins a loop to examine the runs of pixels in the data row. Runs between the defined values MINRUN and MAXRUN are examined by the loop. The j-loop, and the test at line 15, locate a run of pixels, and sets the variable, k, to the index of the start of the run. The test at line 21 selects only blocks of pixels having length, i, less than the length of the row. The loop in line 22 moves the pixel run to temporary storage in the array block[].

The two tests at lines 24 and 25 reject blocks having run lengths other than the one required by the current value of the i-loop. The embedding scheme selects blocks of length, i, for embedding by adding a pixel to make the length i+1. This assures that the run can contain either i or i+1 non-zero pixel values, according to the bit-stream of the auxiliary embedded data. If the run stored in the variable block[] array does not end in at least two zeroes, it is not acceptable as a run of length, i+1, and the code branches to NEXT, to examine the next run found.

Line 28 begins a loop to count the number of pixels in the run. The number found is incremented by one in line 31 to account for the pixel added to make the run length equal to i+1. Line 33 contains a test ensuring that the run selected has the correct length. The histogram[] array for the run-length index, i, is incremented to tally the occurrence frequency of the run. The data row bytes for the run are flagged by the loop in line 36, with a letter code used to distinguish the runs located. This flagging technique permits the embedding code to identify easily the runs to be used for embedding the bit-stream. On exit from this routine, the data row bytes contain runs flagged with letter codes to indicate the usable pixel positions for embedding the bit-stream. The return value is the number of runs located in the data row. A return of zero indicates no runs within the defined limits of MINRUN and MAXRUN were located.

FAX modem protocols emphasize speed, and therefore do not include error-correction. For this reason, FAX transmissions are subject to drop-outs, to impulsive noise, and to lost data, depending on the quality of the telephone line and the speed of the transmission. For successful embedding, the present invention must account for the possible loss of some portion of the image data. To accomplish this, a variation of modem block-protocols is used to embed the header and the auxiliary data. The two color image is treated as a transmission medium, with the data embedded in blocks, or packets, providing for packet-start flags, and parity checks. The start of a packet is signaled by an image row having its first pixel in an even column. The packet ends when the number of bits contained in the block are extracted, or, in the case of a corrupted packet, when a packet-start flag is located in a line. A checksum for parity, and a packet sequence number, are embedded with the data in a packet. Using this method, errors in the FAX transmission result in possible loss of some, but not all, of the embedded data.

The amount of data lost because of transmission errors depends on the density of pixels in the source image and the length of a dropout. Using 20 bytes per packet, a large dropout in transmission of standard text results in one or two packets of lost data. Generally, the success of the invention follows the legibility of the faxed host image information.

Turning now to FIG. 7, there can be seen a listing of the steps necessary to initialize the two color BITMAP® lines to flag the start of each packet. Each row in the two color image contains a non-zero value beginning in an even column (packet start), or in an odd column (packet continuation).

In FIG. 7, it can be seen that line 4 starts a loop over the number of pixels in a data row. In FAX images, a zero (0) pixel value indicates a black space, and a one (1) value indicates a white space. Line 5 locates the first black space in the data for the row. If the variable, packet_size, is positive, the column index is tested to be even and the pixel is forced to be a white space. If the packet_size variable is negative, the routine returns an indicator of the data row flag without making changes. If packet_size is greater than zero, the first data row element is flagged as a white space. Line 11 deals with the case in which packet_size=0, indicating a continuation row. In the event of a continuation row, the first data row element is forced to a black space. The values returned by subroutines in lines 17–20 show the nature of the pixel row examined.

The code fragment listed in FIG. 8 provides auxiliary data embedding into two color BITMAP® FAX images. The pixels in a row are processed as described above by examining the contents of the data row after it has been analyzed and flagged with letter codes to indicate the run lengths. Lines 1 through 49 are part of a large loop (not shown) over the pixel index, Ij, in the two color BITMAP® image. Lines 1–26 handle the reading of one line of pixels from the two color BITMAP®, and store the row number of the image in the variable, nrow, in line 1. The pixel value bits are decoded and expanded into the image_row[] array in lines 12–36. The image_row[] array contains the pixel values stored as one value (0 or 1) per byte.

Line 28 uses the packet_col() routine to return the packet-index for the row. If j is 0 in line 28, the row is a packet-start row, and if j is 1, the row is a continuation row. Line 29 uses the rowstats() routine to assign run-length letter flags to the pixels in the row buffer. The return value, i, gives the number of runs located in the image row. Consistency tests are made at lines 31, 37, and 41. The index, kp, gives the pixel row number within a data packet. If kp is 0, the line must be a packet-start index, and if kp>0, the line must be a continuation line. Line 49 completes the process of reading and preprocessing a row of two color image data.

The data-structure array, pair[], contains the run length for (i), the augmented run length, (i+1), and the total number of runs in the two color BITMAP® image. The index, k, in the loop starting at line 51, is the index for the run lengths being embedded. The index, inrow, counts pixels within the image row buffer, and the variable, bitindex is the bit-position index in the bit-stream byte.

Line 57 sets the value of the run-length letter-code in the variable, testltr. The value of an image pixel is tested against the letter-code in line 58. If the test letter-code flag is located, line 60 advances the index in the row to the end of the pixel run being used for embedding. The test function in line 62 checks the value for the current bit index in the bit-stream packet byte. If the value is one, the last pixel in the run is set to one. Otherwise, the last pixel in the run is set to 0.

Setting the value of the pixel trailing a run implements the embedding in the two color BITMAP® images by introducing noise generated according to the pseudo-random bit-stream in the packet data. The letter flag values written into the row buffer by the call to rowstats() in FIG. 8 are reset to binary unit value before the image_row array data are packed and written back to the .BMP format file. The process for doing this is not illustrated in FIG. 8, but is straightforward for those skilled in the art.

Extraction of data embedded into a two color BITMAP® FAX image, according to the present invention, can be accomplished only if the transmission of the FAX is received by a computer. The image data are stored by the receiving computer in a file format (preferably a FAX compressed format), permitting the processing necessary to convert the image to BITMAP® format and to extract the embedded data. FAX data sent to a standard office machine are not amenable to data extraction because the printed image is generally not of sufficient quality to allow for recovery of the embedded data through scanning.

However, the invention does apply to scanning/printing FAX machines that process data internally with computer hardware. Auxiliary embedded data are inserted after the scanning of the host data, but prior to transmission. The auxiliary embedded data are extracted after they have been received, but before they are printed.

The key for two color image embedding can be recovered by analyzing the embedded image, because the run lengths are not changed from the original (i,i+1) values. The order in which the values are used depends on the frequency of occurrence in the image. As in the example for palette-color images, a key to the value and order of the pairs used for embedding is inserted into the FAX. However, the key is not strictly required, because, in principle, knowledge of the defined values MINRUN and MAXRUN permits re-calculating the run-length statistics from the received image. In practice, the key is required because transmission errors in the FAX-modem communication link can introduce new run-lengths that alter the statistical properties of the image, and because the pair ordering is not known. Even though FAX embedding is somewhat less secure than embedding auxiliary data into palette-color images, the two color BITMAP® FAX embedding of data still can be regarded as similar to one-time-pad cryptography.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of embedding auxiliary data into host data comprising the steps of:

creating a digital representation of said host data in the form of elements having numerical values and containing a noise component;

creating a digital representation of said auxiliary data in the form of a sequence of INDIVIDUAL bit VALUES;

evaluating said noise component of said digital representation of said host data;

comparing pairs of said elements with said noise component to determine pairs of said elements having numerical values which differ by less than said value of said noise component;

replacing individual values of said elements with substantially equivalent values from said pairs of elements in order to embed individual bit values of said auxiliary data corresponding to said sequence of bit values of said auxiliary data; and outputting said host data with said auxiliary data embedded into said host data as a file.

2. The method as described in claim 1 further comprising the step of combining said auxiliary data with predetermined information indicative of said auxiliary data, its file name, and file size, said step to be performed after the step of digitizing said auxiliary data.

3. The method as described in claim 1 further comprising the step of determining a protocol for embedding said auxiliary data into said host data which allows for verification of said auxiliary data upon extraction from said host data.

4. The method as described in claim 1, wherein said host data comprises a color photograph.

5. The method as described in claim 1, wherein said host data comprises a black and white photograph.

6. The method as described in claim 1, wherein said host data comprises a television signal.

7. The method as described in claim 1, wherein said host data comprises a painting.

8. The method as described in claim 1, wherein said host data comprises a facsimile transmission.

9. The method as described in claim 1, wherein said host data comprises an identification card.

10. The method as described in claim 1, wherein said host data comprises digital audio information.

* * * * *